United States Patent [19]
White

[11] Patent Number: 5,678,948
[45] Date of Patent: Oct. 21, 1997

[54] SELECTIVELY LOCKABLE AND HORIZONTALLY AND VERTICALLY ALIGNING LATCH FOR FURNITURE PARTS

[75] Inventor: Timothy P.G. White, North Webster, Ind.

[73] Assignee: B. Walter and Co., Inc., Wabash, Ind.

[21] Appl. No.: 568,479

[22] Filed: Dec. 7, 1995

[51] Int. Cl.$^6$ ............................................. F16B 2/02
[52] U.S. Cl. ..................... 403/321; 403/407.1; 108/64; 292/113; 292/240
[58] Field of Search ........................ 403/321, 322, 403/13, 14, 49, 405.1–407.1, 338, 373, 324, 384; 108/65, 64, 59, 69, 66, 78; 24/589, 630, 647; 292/257, 240, 113, DIG. 20, DIG. 30

[56] References Cited

U.S. PATENT DOCUMENTS

| | | | |
|---|---|---|---|
| 996,666 | 7/1911 | Odenbrett | 24/589 X |
| 1,014,148 | 1/1912 | Heller. | |
| 2,513,592 | 7/1950 | Silverman. | |
| 2,802,251 | 8/1957 | Wallace. | |
| 2,824,315 | 2/1958 | McKenny. | |
| 2,846,258 | 8/1958 | Granberg | 292/DIG. 20 X |
| 2,873,134 | 2/1959 | Ahlgren | 292/DIG. 20 X |
| 3,848,912 | 11/1974 | Jensen et al. | 292/113 X |
| 3,915,100 | 10/1975 | Sullivan | 108/64 |
| 4,165,908 | 8/1979 | Cooper et al. | 108/64 X |
| 4,266,882 | 5/1981 | Wilhelmi et al. | 403/14 |
| 4,365,832 | 12/1982 | Treppler | 292/113 X |
| 4,433,881 | 2/1984 | Witten et al. | 312/111 X |
| 4,530,136 | 7/1985 | Konkle. | |
| 4,646,654 | 3/1987 | Sullivan | 108/66 X |
| 4,693,187 | 9/1987 | Bisbing | 108/65 X |
| 4,802,422 | 2/1989 | Beard | 108/64 |
| 4,881,305 | 11/1989 | Rivera. | |
| 4,915,034 | 4/1990 | Grabe et al. | 108/64 X |
| 5,144,725 | 9/1992 | Krauss. | |

FOREIGN PATENT DOCUMENTS

| | | | |
|---|---|---|---|
| 2920878 | 11/1980 | Germany | 292/113 |
| 2100121 | 12/1982 | United Kingdom | 108/64 |

OTHER PUBLICATIONS

Exhibit "A" photograph of prior art mechanisms.

*Primary Examiner*—Harry C. Kim
*Attorney, Agent, or Firm*—George Pappas

[57] ABSTRACT

A latch mechanism for furniture parts such as extension tables and leaves. The mechanism aligns the furniture parts horizontally and vertically and is selectively lockable for preventing disengagement. A strike member including a pair of fingers is attachable to one of the furniture parts. A lock member is attachable to the other furniture part and forms a pair of apertures between the lock member and furniture part. The strike member fingers are received within the respective lock member apertures and a lock mechanism selectively detachably attaches the strike member and lock member together.

18 Claims, 3 Drawing Sheets

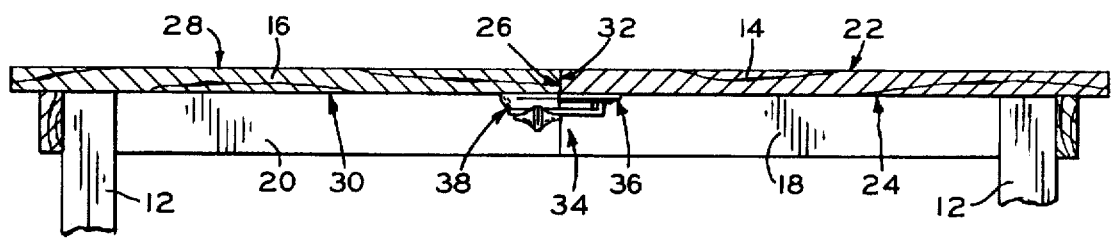
FIG_1
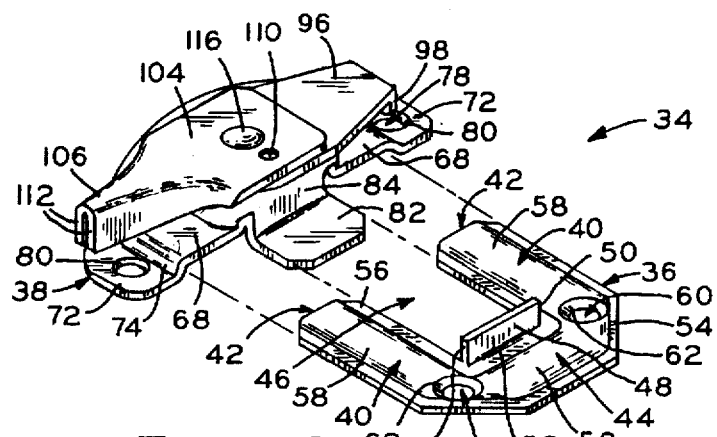
FIG_2
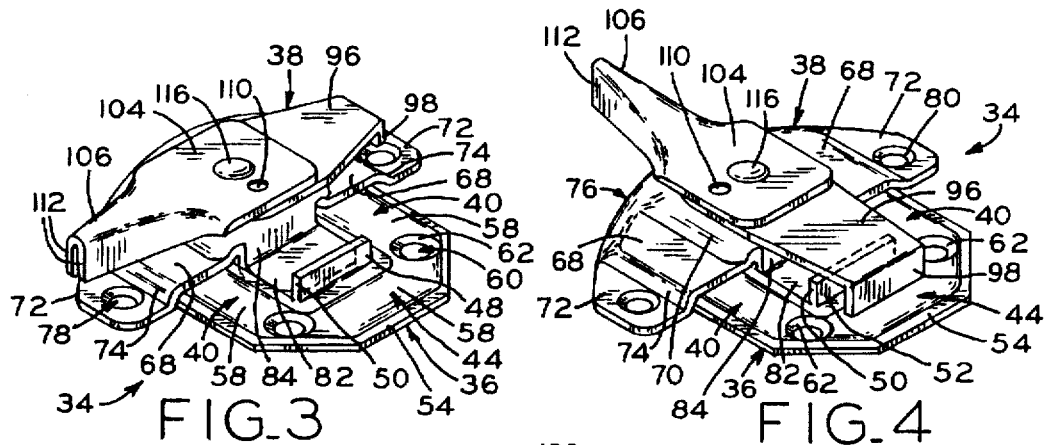
FIG_3    FIG_4
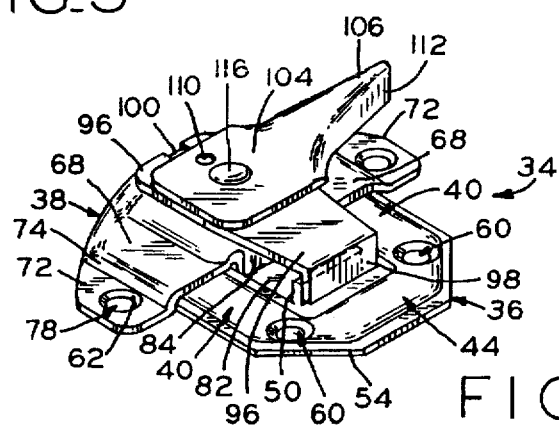
FIG_5

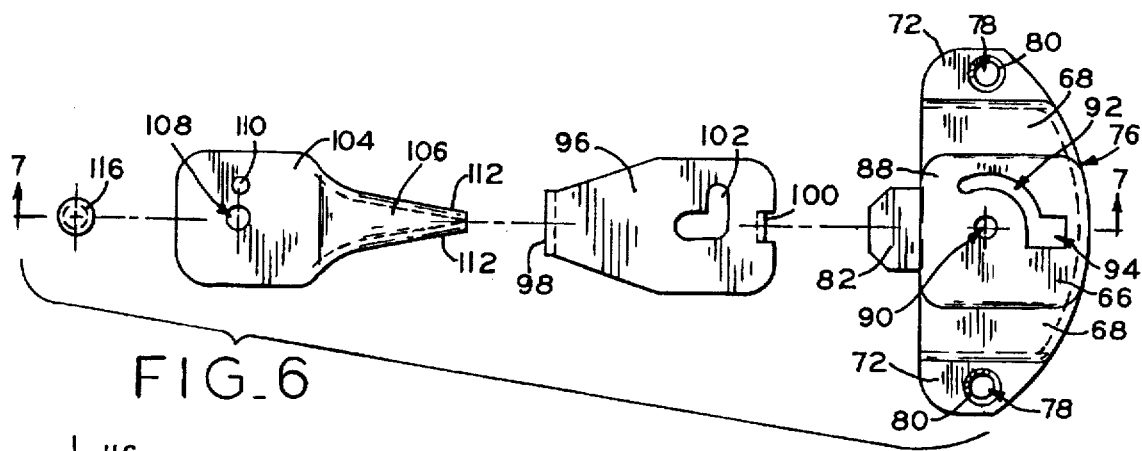
FIG_6
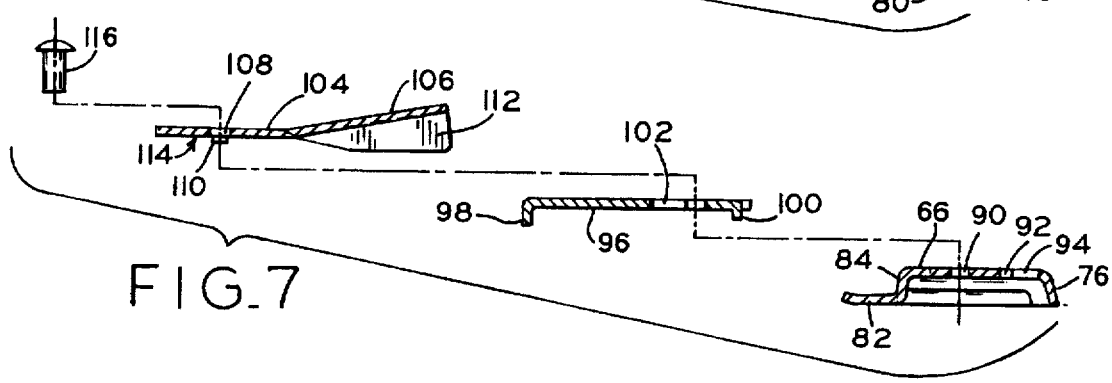
FIG_7
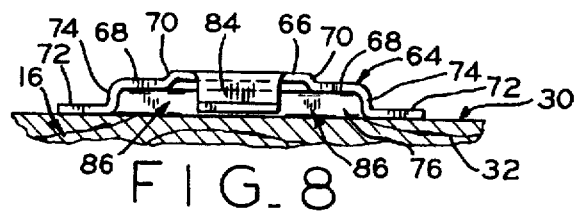
FIG_8
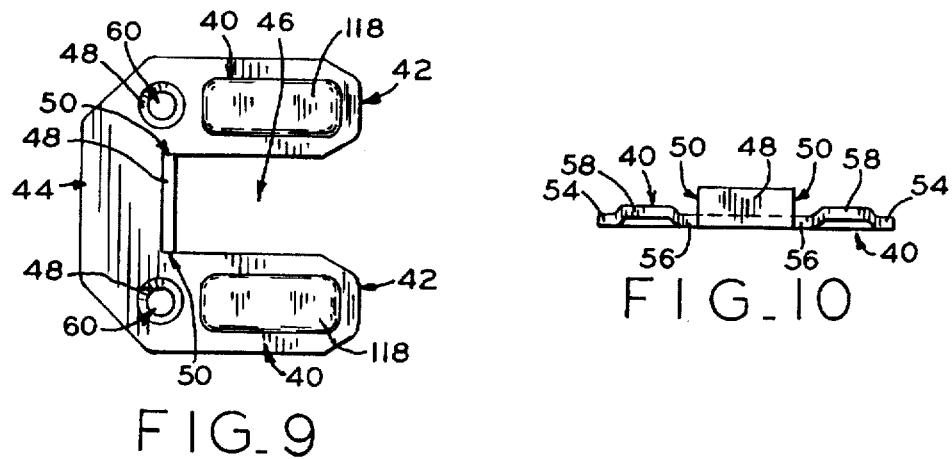
FIG_9
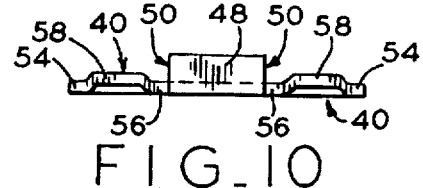
FIG_10

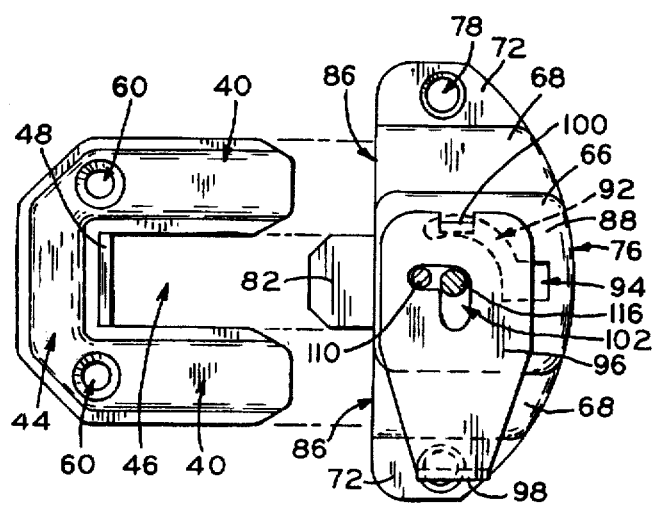
FIG_11
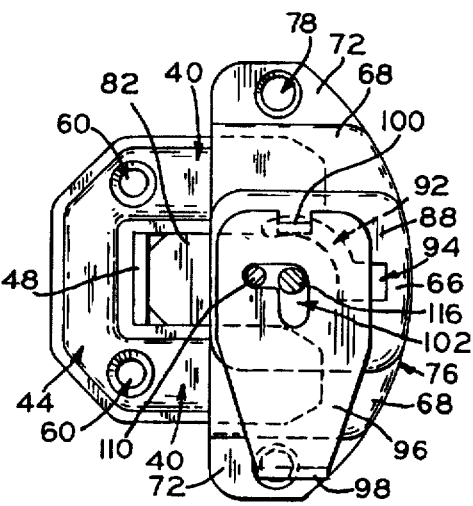
FIG_12
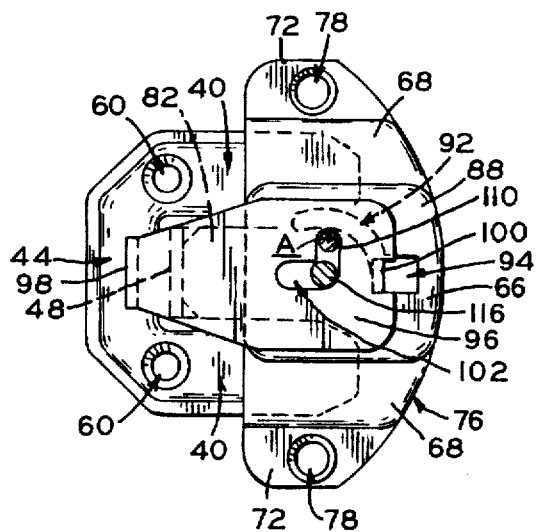
FIG_13
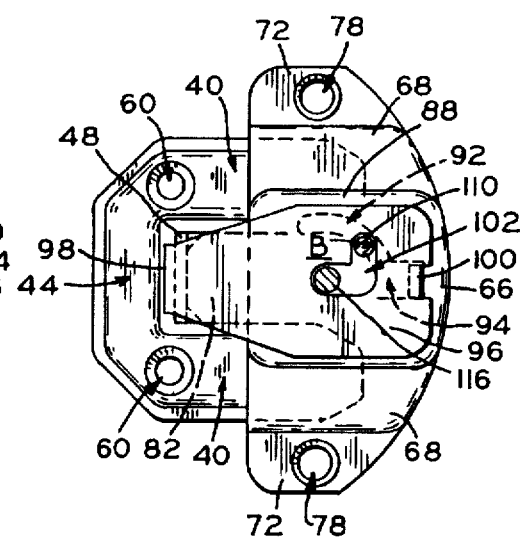
FIG_14

SELECTIVELY LOCKABLE AND HORIZONTALLY AND VERTICALLY ALIGNING LATCH FOR FURNITURE PARTS

TECHNICAL FIELD

The present invention relates to the technical field of furniture hardware. More specifically, the present invention relates to latch mechanisms which are capable of both aligning and selectively locking together two furniture parts such as table halves and auxiliary table leaves.

BACKGROUND OF THE INVENTION

A long standing problem in extension tables and other similar furniture has been the proper alignment of the table halves and/or leaves with respect to one another. That is, to cause the table halves and/or leaves to come together with the table top and table edges aligned, thereby providing an overall flat top surface and preventing people from catching themselves on misaligned edges. Misaligned table tops and side edges are also quite unsightly and undesirable.

Another long standing problem in extension tables and leaves is that they tend to creep apart over time, creating an unsightly gap in between the table halves and/or leaves. Such unsightly gap can also be unsanitary, since food particles tend to become lodged therein. Furthermore, with the table halves improperly secured to one another, the table is typically less stable.

Although numerous latch mechanisms have been devised in the past for aligning and locking together table halves and leaves, such prior latch mechanism have shortcomings and drawbacks. The prior latch mechanisms have failed to provide positive alignment both vertically and horizontally (side to side) while providing a positive locking function for detachably attaching the table halves and/or leaves together and preventing them from creeping apart. Accordingly, a need exists for a latch mechanism that is generally inexpensive to manufacture and which provides positive horizontal and vertical alignment of the furniture parts and, further, which selectively provides positive locking between the furniture parts and prevents them from creeping apart from one another.

SUMMARY OF THE INVENTION

It is the principal object of the present invention to overcome the above discussed disadvantages associated with prior latch mechanisms.

The present invention overcomes the disadvantages associated with prior latch mechanisms by providing a strike member which is adapted to be mounted to a first furniture part or table half. The strike member includes a pair of fingers extending beyond the table half edge and generally perpendicular thereto. A lock member is also provided and is mounted to a second furniture part on the other table half. The lock member includes a base which, when mounted to the second furniture part, forms a pair of apertures between the base and the second furniture part. The lock member is located and mounted on the second furniture part in a manner whereby, when the edges of the first and second furniture parts are brought together, the strike member finger are received within the respective pairs of lock member apertures.

The latch mechanism further includes an arm pivotally attached to the lock member and which is adapted to selectively be pivoted for engaging an ear located on the strike member. More specifically, initial rotation of a handle, places the arm in a position generally extending parallel to the strike member fingers, and placing a boss at the end of the arm adjacent an ear on the strike member. Additional rotation of the handle causes engagement of a cam member causing the arm to move parallel to the strike fingers toward the lock member thereby causing the arm boss to engage the strike ear and pull the strike member toward the lock member and, also, pulling the strike member fingers into the respective lock member apertures. Accordingly, the first and second furniture parts or table halves are tightly pulled together without any gap therebetween and, because the strike member fingers are received within the lock member apertures, the furniture parts are retained positively aligned with one another both horizontally and vertically.

It is noted that, depending on the edge length of the furniture parts or table halves and leaves, a plurality of latch mechanisms may be used as needed to align and lock the two furniture parts together. Additionally, because the latch mechanism is typically used on wood furniture parts, both the strike member and lock member are each provided with a pair of holes adapted to receive a screw for mounting the strike members and lock members to their respective furniture parts.

Preferably, the strike member fingers are connected to one another at a head portion and the head portion and fingers generally form a U-shape. The strike member is also preferably made of metal by a stamping process and the fingers are generally coplanar with one another. The ear is integrally formed by bending a tab at the head portion to an angle with respect to the coplanar fingers. Additionally, the arm is pivotally attached to the lock member in between the lock member apertures thereby evenly pulling on the strike member and generally evenly distributing the pulling force through the strike member ear to each of the strike member fingers.

In one form thereof, the present invention is directed to a selectively lockable and horizontally and vertically aligning latch mechanism for selectively aligning and fastening two furniture parts. The latch mechanism includes a strike member having a pair of fingers. The strike member is adapted to be mounted to a first furniture part. A lock member is also provided and includes a base adapted to be mounted to a second furniture part. A pair of apertures are formed between the base and the second furniture part. The strike member pair of fingers are selectively received in the respective pair of apertures when the first and second furniture parts are brought together. A latch member is provided for selectively detachably attaching the strike member and first furniture part to the lock member and second furniture part when the pair of fingers are received within the respective apertures.

BRIEF DESCRIPTION OF THE DRAWINGS

The above-mentioned and other features and objects of this invention and the manner of obtaining them will become more apparent and the invention itself will be better understood, by reference to the following description of embodiments of the invention taken in conjunction with the accompanying drawings wherein:

FIG. 1 is a cross-sectional partial view of two table halves and showing a latch mechanism constructed in accordance with the principles of the present invention mounted on and retaining the tables halves together;

FIG. 2 is a perspective view of the latch mechanism shown in FIG. 1 with the strike member and lock member separated from one another;

FIG. 3 is a perspective view of the latch mechanism shown in FIG. 1, and wherein the strike member fingers are received within the lock member apertures;

FIG. 4 is a perspective view of the latch mechanism shown in FIG. 1, and wherein the lock member arm is pivoted approximately 90 degrees and generally parallel to the strike member fingers;

FIG. 5 is a perspective view of the latch mechanism shown in FIG. 1, and wherein the lock member handle is pivoted to its fully latched position and the lock member arm is moved parallel with the strike member fingers and causing the arm boss to engage the strike member ear and pull the strike member fingers toward the lock member apertures;

FIG. 6 is a top plan exploded assembly view of the lock member shown in FIG. 2;

FIG. 7 is a sectional view taken generally along line 7—7 of FIG. 6;

FIG. 8 is a front elevation view of a lock member base mounted on a furniture part and forming a pair of apertures in accordance with the principles of the present invention;

FIG. 9 is a top plan view of an alternate embodiment of strike member constructed in accordance with the principles of the present invention;

FIG. 10 is a front elevation view of the strike member shown in FIG. 2;

FIG. 11 is a top plan view of the latch mechanism shown in FIG. 1, with the handle removed, and wherein the strike member and lock member are separated from one another;

FIG. 12 is a top plan view of the latch mechanism shown in FIG. 11, and wherein the strike member fingers are received within the lock member apertures;

FIG. 13 is a top plan view of the latch mechanism shown in FIG. 11, and wherein the lock member arm is rotated generally parallel to the strike member finger; and, FIG. 14 is a top plan view of the latch mechanism shown in FIG. 12, and wherein the lock member arm has been moved longitudinally toward the lock member causing the arm boss to engage the strike member ear and pulling the strike member fingers into the lock member apertures.

Corresponding reference characters indicate corresponding parts throughout the several views of the drawings.

The exemplifications set out herein, illustrate preferred embodiments of the invention in one from thereof and such exemplifications are not to be construed as limiting the scope of the disclosure or the scope of the invention in any manner.

DETAILED DESCRIPTION OF THE PREFERRED EMBODIMENTS

Referring initially to FIG. 1, an extension table is shown and generally depicted by the numeral 10. Extension table 10 includes a first table top 14 and a second table top 16 and respective table aprons 18 and 20. Table tops 14 and 16 are selectively extendable apart from one another in a known and customary manner, for example, for adding leaves therebetween and increasing the overall table size. Table top 14 includes a top surface 22, bottom surface 24 and a horizontal inner side edge 26. Table top 16 includes a top surface 28, bottom surface 30 and horizontal inner side edge 32.

A latch mechanism constructed in accordance with the principles of the present invention is shown in the drawings and generally designated by the numeral 34. Latch mechanism 34 includes a strike member 36 adapted to be mounted as shown in FIG. 1 to bottom surface 24 of first table top 14 and adjacent the horizontal inner side edge 26. Latch mechanism 34 also includes a lock member 38 adapted to be mounted on the bottom surface 30 of second table top 16 and adjacent its horizontal inner side edge 32. As shown and as more fully described hereinbelow, latch mechanism 34 functions to selectively align table tops 14 and 16 both horizontally and vertically and, further, to selectively retain the table tops locked together and preventing them from creeping apart during normal use of the table.

Strike member 36 is preferably made of metal with a thickness of 0.040 to 0.20 inch. Strike member 36 is made by a stamping process and includes a pair of fingers 40 having forward ends 42. At their other end, fingers 40 are integrally connected to one another via head portion 44. As shown, head portion 44 and fingers 40 generally form a U-shape with a central channel 46. Fingers 40 and head portion 44 are generally coplanar with one another. An ear 48 is located in between fingers 40 at the bottom of channel 46, and extends generally perpendicularly upwardly therefrom. Ear 48 is formed by cutting its side edges 50 from fingers 40 and bending upwardly at bend line 52 to a position as shown. More preferably, ear 48 is bent slightly past the vertical and to an acute angle with respect to head portion 44.

Strike member 36 is further formed having an outer perimeter band 54 and inner perimeter band 56 stamped on to the strike member and creating a central raised portion 58 therebetween. Outer and inner perimeter bands 54 and 56, together with central raised portion 58, create a shallow channel beam structure thereby strengthening fingers 40, head portion 44 and the inter connections therebetween. Strike member 36 is further provided with a pair of holes 60 with chamfered walls 62 adapted to receive a wood screw (not shown) for mounting the strike member 36 on to the bottom surface 24 of first table top 14 as shown in FIG. 1.

The latch mechanism lock member 38 is made of the plurality of components each also made of metal with a thickness of 0.040 to 0.20 inch by stamping and forming processes. Lock member 38 includes a base 64 as best shown in FIGS. 6-8. Base 64 is formed having a top platform 66 which is integrally connected to and located at a slightly higher level than intermediate platform 68. Top platform 66 and intermediate platform 68 are integrally connected with one another via walls 70. Intermediate platforms 68 are located above and are each integrally connected to respective feet 72 via walls 74. At the rear of base 64, rear wall 76 extends and is integrally connected to feet 72, walls 74, intermediate platforms 68, walls 70 and top platform 66. Each of feet 72 are provided with a hole 78 defined by chamfered walls 80 and adapted to receive a wood screw (not shown) for mounting lock member 38 to the bottom surface 30 of second table top 16.

At the front of base 64, a tongue 82 is provided and is integrally interconnected with top platform 66 via front wall 84. Tongue 82, as shown, is generally coplanar with feet 72. As best shown in FIGS. 11–14, tongue 82 and front wall 84 are slightly smaller in width than the width of central channel 46 of strike member 36. Accordingly, a pair of apertures 86 are formed generally between walls 74, intermediate platform 68, front wall 84 and portions of bottom surface 30 of table top 16. As shown, the openings to apertures 86 are adjacent front wall 84. Further, apertures 86 extend backwardly toward and terminate at base rear wall 76.

In operation, fingers 40 are selectively received within apertures 86 and tongue 82 is received within central channel 46 whenever first and second table tops 14 and 16 are brought together. Because strike member 36 is securely mounted to table top 14 and base 64 of lock member 38 is securely mounted to table top 16, the table tops are caused to be aligned both horizontally and vertically. Furthermore, fingers 40 and apertures 86 are sized so as to have a generally close fit, thereby preventing excess play and positively providing accurate horizontal and vertical alignment.

Referring now more specifically to FIGS. 6, 7 and 11–14, the top platform 66 includes a top flat surface 88. Top platform 66 is also provided with a pivot hole 90 and a radial opening 92 communicating with a rectangular opening 94.

An arm 96 is provided overlaying top platform 66. Arm 96 is also made of metal via a stamp forming process. A boss 98 is provided at one longitudinal end of arm 96 and is formed by bending downwardly the end portion of arm 96. Boss 98, as shown, is bent to a position generally perpendicular to arm 96 and, more preferably, is bent to form an acute angle with respect to arm 96. At its other longitudinal end, arm 96 includes a tab follower 100. Tab follower 100 is formed quite similar to boss 98 by bending a portion of arm 96 downwardly and generally perpendicular to arm 96. Arm 96 further included an L-shaped opening 102 located intermediate tab follower 100 and boss 98. When arm 96 is received over top platform 66, L-shaped opening 102 of arm 96 communicates with pivot hole 90 of base 64. Further, tab follower 100 of arm 96 extends into radial and rectangular openings 92 and 94 of base 64.

Lock member 38 also includes a handle 104 having a grip blade 106, a central pivot hole 108 and a cam pin 110. Grip blade 106 is preferably formed as shown by bending wing portions 112 downwardly and forming an area whereat an operator may readily grasp and turn the handle. Cam pin 110 is preferably formed by punching the metal thereat perpendicularly and thereby forming the cam pin 110 extending downwardly from the bottom face 114 of handle 104. Handle 104 is received over arm 96 with its central pivot hole 108 communicating with L-shaped opening 102 of arm 96 and pivot hole 90 of base 64. Additionally, cam pin 110 of handle 104 is received within the L-shaped opening 102 of arm 96.

Base 64, arm 96 and handle 104 are assembled and retained together, as shown, via a rivet 116 extending through central pivot hole 108 of handle 104, L-shaped opening 102 of arm 96, and pivot hole 90 of base 64. Rivet 116 is placed and secured therein in a known customary manner and so as to allow relative pivotal motion between handle 104, arm 96 and base 64.

In operation, as best shown in FIGS. 2–5 and 11–14, prior to locking the strike member 36 and lock member 38 to one another, the table top halves 14 and 16 are brought together placing fingers 40 within apertures 86 and tongue 82 within central channel 46. In this position, as shown in FIG. 3, arm 96 and handle 104 extend generally parallel to one another and perpendicular to fingers 40. As can be appreciated, in this position, neither arm 96 nor handle 104 obstruct the apertures 86, thereby allowing fingers 40 to readily and easily be received therein. It is noted that in this position, as shown in FIGS. 11 and 12, the tab follower 100 extends into and is located within radial opening 92 and rivet 116 is located at the central area of L-shape opening 102.

By rotating the handle 104 approximately 90 degrees from the position shown in FIG. 3 to the position shown in FIG. 4, cam pin 110 is also rotated about 90 degrees about rivet 116 as indicated by arrow "A". Simultaneously, tab follower 100 slides radially along radial opening 92 to within rectangular opening 94 as shown in FIG. 13. This also pivots the entire arm 96 approximately 90 degrees to a position as shown in FIGS. 4 and 13 whereat arm 96 extends over ear 48 and boss 98 is adjacent thereto and over head portion 44 of strike member 36.

By turning handle 104 an additional approximate 90 degrees from the position of FIG. 4 to the position shown in FIG. 5, arm 96 is moved in a direction generally parallel to fingers 40 and toward lock member 38 thereby causing boss 98 of arm 96 to engage the ear 48 of strike member 36 and thereby also urging or pulling the strike member and first table top 14 toward the lock member 38 and second table top 16. More specifically, as shown in FIGS. 13 and 14, as handle 104 is pivoted further toward the position shown in FIG. 5, cam pin 110 is urged backwardly as indicated by arrow "B" thereby causing tab follower 100 to move within rectangular opening 94 backwardly toward rear wall 76 and thereby also placing rivet 116 within one leg of the L-shaped opening 102. As can be appreciated, in this manner, boss 98 engages ear 48 thereby locking the strike member 36 and lock member 38 together as shown.

For unlocking the strike member 36 from the lock member 38, handle 104 is merely rotated in the opposite direction first causing arm 96 to move in a direction parallel to fingers 40 and placing the arm 96, rivet 116, cam pin 110, tab follower 100 etc., in the positions as shown in FIG. 13. Additional turning of handle 104 to a position as shown in FIG. 3 causes arm 96 to be rotated to a position as shown in FIGS. 12 and 3 thereby unlocking the strike member 36 and lock member 38 and thereby allowing them to be pulled apart and removing fingers 40 from apertures 86.

In FIG. 9 there is shown an alternate most preferred embodiment of the strike member 36 wherein outer and inner perimeter bands 54 and 56 are not incorporated. Rather, only fingers 40 are provided with raised areas 118. In this manner, additional strengthening is provided only where needed most on fingers 40 and, thereby, decreasing manufacturing costs. More importantly, the forward ends 42 of fingers 40 are generally flat and do not increase in height until raised areas 118. This provides more "pointed" or "thinner" finger tips that are more easily received in the apertures 86.

While the invention has been described as having specific embodiments, it will be understood that it is capable of further modifications. This application is, therefore, intended to cover any variations, uses, or adaptations of the invention following the general principles thereof and including such departures from the present disclosure as come within known or customary practice in the art to which this invention pertains and fall within the limits of the appended claims.

What is claimed is:

1. In combination, a selectively lockable and horizontally and vertically aligning latch mechanism and two furniture parts for selectively aligning and fastening said two furniture parts, said latch mechanism and furniture parts combination comprising:

a strike member including a pair of fingers, said strike member adapted to be mounted to a first furniture part;

a lock member including a base adapted to be mounted to a second furniture part and form a pair of apertures between said base and said second furniture part, said strike member pair of fingers being selectively received in said respective pair of apertures when the first and second furniture parts are brought together;

latch means for selectively detachably attaching said strike member and first furniture part to said lock member and second furniture part when said pair of fingers are received in said respective apertures; and wherein said latch means includes an ear on said strike member and an arm pivotally attached to said lock member, said arm selectively engaging said ear and detachably attaching said strike member and the first furniture part to said lock member and the second furniture part.

2. The latch mechanism and furniture parts combination of claim 1, wherein said strike member fingers are connected to one another at a head portion, said head portion and fingers generally forming a U-shape, and wherein said ear is located at said head portion between said fingers.

3. The latch mechanism and furniture parts combination of claim 2, wherein said strike member head portion, fingers and ear are integrally formed with one another.

4. The latch mechanism and furniture parts combination of claim 3, wherein said strike member is made of metal, said fingers being generally coplanar with one another and said ear being bent at an angle therefrom.

5. The latch mechanism and furniture parts combination of claim 3, further comprising a pair of holes in said strike member, each hole adapted to receive a screw for mounting said strike member to the first furniture part.

6. The latch mechanism and furniture parts combination of claim 2, wherein said arm is pivotally attached to said lock member base generally between said pair of apertures.

7. The latch mechanism and furniture parts combination of claim 1, further comprising cam means for moving said arm generally parallel to said fingers, whereby said arm is selectively pivotable and movable for engaging said ear and pulling said strike member toward said lock member and pulling said fingers into said respective apertures.

8. The latch mechanism and furniture parts combination of claim 7, wherein said cam means includes a handle pivotally attached to said lock member and engaging said arm, wherein pivotal turning of said handle causes said arm to both pivot and move parallel to said fingers.

9. The latch mechanism and furniture parts combination of claim 8, wherein said arm includes a boss extending therefrom for engaging said ear when said arm is moved parallel to said fingers toward said lock member.

10. The latch mechanism and furniture parts combination of claim 9, further comprising a pair of holes in said lock member, each hole adapted to receive a screw for mounting said lock member to said second furniture part.

11. The latch mechanism and furniture parts combination of claim 7, wherein said strike member fingers are connected to one another at a head portion, said head portion and fingers generally forming a U-shape, and wherein said ear is located at said head portion between said fingers.

12. The latch mechanism and furniture parts combination of claim 11, wherein said arm is pivotally attached to said lock member base generally between said pair of apertures.

13. The latch mechanism and furniture parts combination of claim 11, wherein said strike member head portion, fingers and ear are integrally formed with one another.

14. The latch mechanism and furniture parts combination of claim 1, wherein said latch means is located between said pair of apertures.

15. The latch mechanism and furniture parts combination of claim 1, further comprising a pair of holes in said strike member, strike member hole adapted to receive a screw for mounting said strike member to the first furniture part, and a pair of holes in said lock member, each lock member hole adapted to receive a screw for mounting said lock member to the second furniture part.

16. In combination, a selectively lockable and horizontally and vertically aligning latch mechanism and two furniture parts for selectively aligning and fastening said two furniture parts, said latch mechanism and furniture parts combination comprising:

a strike member including a pair of fingers, said strike member adapted to be mounted to a first furniture part;

a lock member including a base adapted to be mounted to a second furniture part and form a pair of apertures between said base and said second furniture part, said strike member pair of fingers being selectively received in said respective pair of apertures when the first and second furniture parts are brought together;

latch means for selectively detachably attaching said strike member and first furniture part to said lock member and second furniture part when said pair of fingers are received in said respective apertures;

wherein said strike member fingers are connected to one another at a head portion, said head portion and fingers generally forming a U-shape, and wherein an ear is located at said head portion between said fingers; and, wherein said latch means includes an arm pivotally attached to said lock member base generally between said pair of apertures.

17. The latch mechanism of claim 16, wherein said latch means is located between said pair of apertures.

18. The latch mechanism of claim 16, further comprising a pair of holes in said strike member, each strike member hole adapted to receive a screw for mounting said strike member to the first furniture part, and a pair of holes in said lock member, each lock member hole adapted to receive a screw for mounting said lock member to the second furniture part.

* * * * *

UNITED STATES PATENT AND TRADEMARK OFFICE
CERTIFICATE OF CORRECTION

PATENT NO. : 5,678,948

DATED : October 21, 1997

INVENTOR(S) : Timothy P.G. White

It is certified that error appears in the above-identified patent and that said Letters Patent is hereby corrected as shown below:

Claim 15, line 12, after "member" insert --each--

Signed and Sealed this

Twenty-seventh Day of January, 1998

Attest:

BRUCE LEHMAN

Attesting Officer

Commissioner of Patents and Trademarks